Nov. 6, 1962 F. A. KROHM 3,061,865
WINDSHIELD WIPER ARM AND BLADE ASSEMBLY
Original Filed April 21, 1954 2 Sheets-Sheet 1
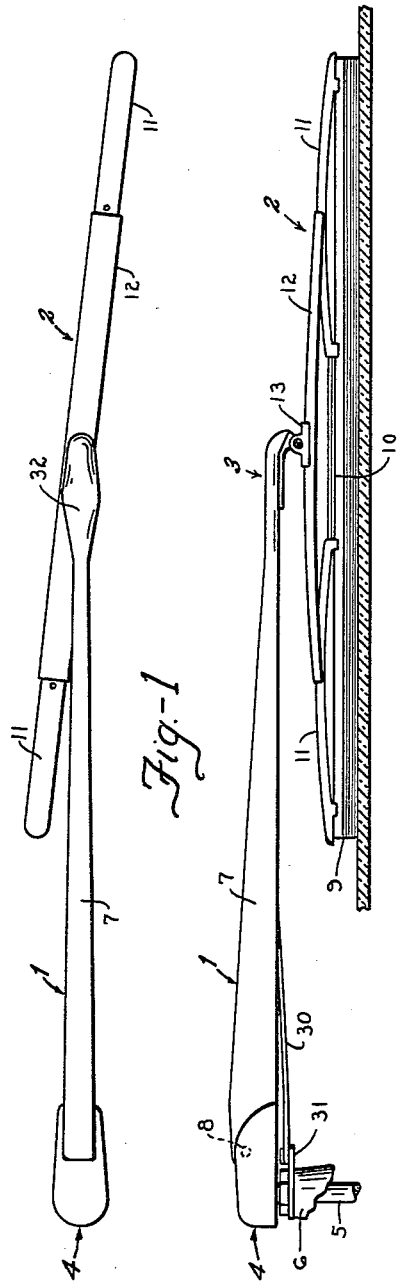
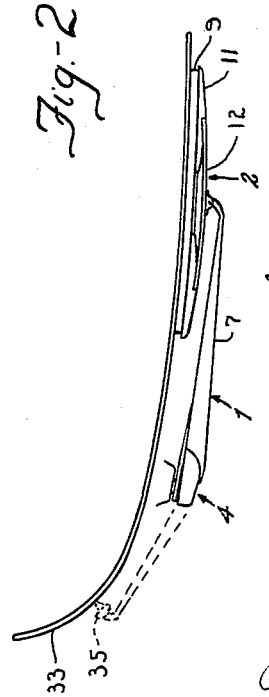
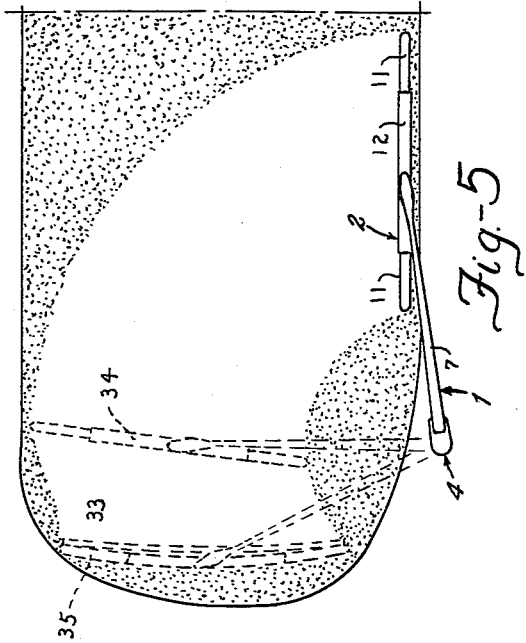
INVENTOR.
FRED A. KROHM
BY
*Charles S. Penfold*
ATTORNEY Nov. 6, 1962 F. A. KROHM 3,061,865
WINDSHIELD WIPER ARM AND BLADE ASSEMBLY
Original Filed April 21, 1954 2 Sheets-Sheet 2
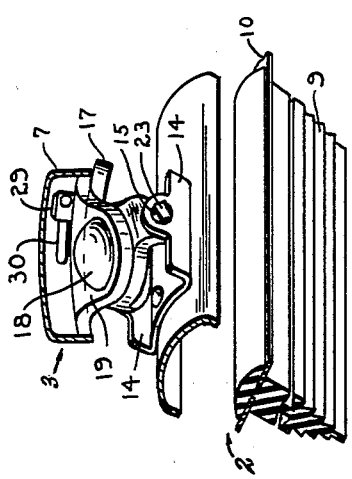
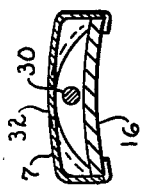
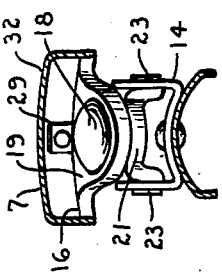
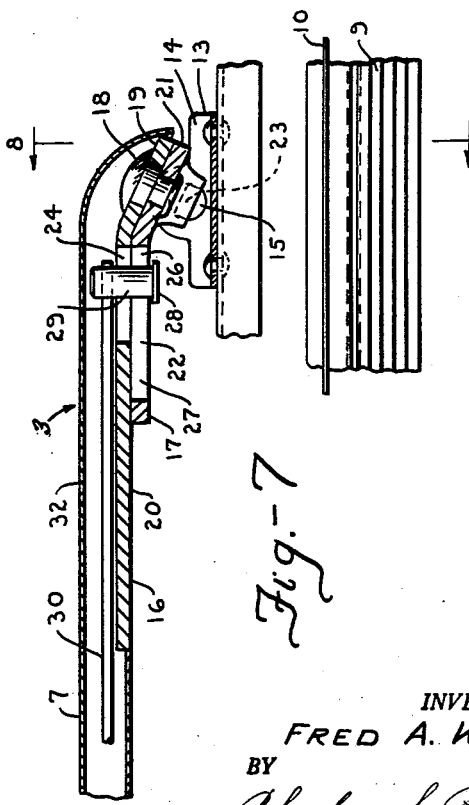
INVENTOR.
FRED A. KROHM
BY
ATTORNEY

United States Patent Office 3,061,865
Patented Nov. 6, 1962

3,061,865
WINDSHIELD WIPER ARM AND BLADE ASSEMBLY
Fred A. Krohm, Hobart, Ind., assignor to The Anderson Company, a corporation of Indiana
Continuation of application Ser. No. 424,647, Apr. 21, 1954. This application May 14, 1959, Ser. No. 813,312
21 Claims. (Cl. 15—250.23)

This invention relates to windshield wiper arm-and-blade assemblies. It relates particularly to arm-and-blade assemblies for wiping windshields presenting varying degrees of curvature, an object of the invention being to provide means for holding the wiper blade at all times more closely perpendicular to the glass than occurs with windshield wiper blade-and-arm assemblies as heretofore practiced.

Another object of this invention is to vary the lateral angular relationship between the axes of the arm and the blade, in infinite progression, and in such manner as will dispose the blade under all conditions, with relation to the glass, advantageously for desirable termination of the wiping pattern at each end of the stroke of the blade.

Another object of the invention is to make commercially practicable the wiping of the "wrap-around" type of windshield, now original equipment on leading makes of automobiles, in such manner as to provide visibility through a substantial portion of the wrap-around area at the end of the windshield, while at the same time providing, in angular relationship between the longitudinal axes of the blade and of the arm, the relationship necessary for correct positioning of the blade for effective wiping of the windshield throughout the entire stroke or travel of the blade.

Another object of the invention is to provide an assembly operatively connecting a windshield wiper arm and blade together and which serves to automatically tilt the blade in a predetermined manner as it pivots with respect to the arm.

Other objects and advantages of the invention will become apparent as its features are further herein explained.

Windshield wiper blade-and-arm assemblies as presently in use as original equipment on curved windshields of the wrap-around type provide the means by which the position of the wiper blade with relation to the arm and the windshield can be varied to suit the curved contour of the glass to be wiped, with the result that, in order to prevent hard portions of the blade structure, and hard portions of the arm, from scratching the windshield, it has been necessary to so limit the arc through which the blade moves on the windshield that the wrap-around section of the windshield is not wiped at all. The wrap-around windshield construction is intended to offer, for driving safety, a wider view of the road and of intersecting roads. However, during rain or snow—or upon dirty road water being splashed against the windshield by other vehicles—the "wrap-around" or wing portions of the windshield become (at the very times when increased visibility is most desirable) a serious limitation to the field of vision of the driver.

The wiping of curved windshields of the conventional design (prevalent prior to 1954 "wrap-around" designs) also presented in somewhat minor form all of the problems herein discussed as to "wrap-around" windshields. Many thousands of such conventional curved windshields have been scratched by metal portions of the superstructure of windshield wiper blades—because, at the outer extremities of the wipe, the blade superstructure assumed a position angularly disposed with relation to the plane tangential to the curved surface at the point of wiper contact. This has tended to permit contact between the metal portions of the superstructure and the glass, particularly after long usage, or after hammering of the blade against the windshield frame (due to overreaching permitted by irregularities of the power-transmission mechanism of the wiper) has loosened up the connections between the functional components of the wiper blade and of its pressure-distributing superstructure.

It, of course, will be understood that the problem of wiping curved windshields and/or wrap-around windshields herein discussed is present in aircraft, commercial vehicles, boats, and other transportation equipment, as well as passenger cars.

Perhaps no recent annoyance and hazard growing out of a change in automobile design has ever caused engineers of vehicle manufacturers, and drivers of automobiles, more serious concern. It, of course, is not possible to determine the extent of accidents to drivers of such cars, caused by their wrap-around windshields, and accidents to others they encounter in traffic, caused by the wrap-around feature.

However, manufacturers of windshield wiping equipment and others have been requested—by vehicle manufacturers and their engineers, over a considerable period of years during which it has been certain that the wrap-around type of windshield would come eventually into general use—to endeavor to invent, develop, and produce a satisfactory wiper arm-and-blade assembly that would remove the hazards above described. During those years manufacturers and prospective manufacturers of windshield wiper equipment have proposed, manufactured, and submitted for tests, a variety of attempted solutions of this critical problem. As far as is known, none of them has been found acceptable. With the exception of the subject invention and related inventions of the inventor thereof, no acceptable apparatus for the purpose has been disclosed or offered to any vehicle manufacturer, so far as information has been available.

Features of the present invention that contribute to its highly successful operation for the purposes stated are novel and of high utility.

Referring briefly to the drawing, it will be noted that the blade 2 is securely pivoted to a first member 16 provided with an opening. Pivoted to the first member for lateral movement with relation thereto is a second member 17 also provided with a cam opening or slot. The first and second members are held together at an extremity or terminal of each by a rivet 18 or similar holding means—in such manner that they may move on said pivot with relation to each other. The extremities or offset portions 19 and 21 so held in contact by such rivets are disposed each at substantially the same angle—with relation to the longitudinal axis of the arm and of the blade. The function of this angle is to vary, with relation to the windshield and with relation to the arm, the vertical medial longitudinal plane of the blade, providing means by which the said vertical plane of the blade may be maintained in substantially normal relationship to the surface of the glass under contact.

It will be noted that the lateral relative position of the two slotted members is controlled by a slidable cam follower 29 disposed within the two cam slots. The position of the cam follower as it travels the length of the cam slots is determined by a flexible "push-pull" wire which is attached to the cam follower and which extends longitudinally of the arm to terminate pivotally at a point eccentric to the shaft which drives the arm.

It will be obvious that, by varying the shape of the cam slots, the position of the blade with relation to the arm may be maintained in such manner as to operate the blade in substantially normal relationship to the glass throughout the entire stroke of the blade. The degree of angularity of the meeting of the ends of the slotted portions may be varied to suit curvature and other conditions peculiar to the windshield to be wiped.

The combination of the angularity of the extremities or terminals of the cam members, above mentioned, and the position of the cam follower, may be employed to provide any desirable variation in the positioning of the blade, with relation to the arm and the windshield, as the blade passes across the wrap-around portions of the windshield. It will be noted from the drawings that this angular feature makes readily attainable correct normalizing of the blade with relation to the windshield when the longitudinal axis of the blade departs considerably in angularity from the longitudinal axis of the arm—as may be necessary to provide a desirable line of termination of the wiped area at the "wrap-around" end of the wipe.

In the drawings wherein one embodiment of the invention is exemplified:

FIGURE 1 is a top view showing a wiper arm and a blade operably connected thereto;

FIGURE 2 is a side view in elevation of the structure illustrated in FIGURE 1;

FIGURE 3 is a view showing the manner in which an actuating means for operating the blade is connected to a mounting which supports the drive shaft for the wiper arm;

FIGURES 4 and 5 are views showing, among other things, the position that the wiper blade takes as it travels on the wing or wrap-around portion of the windshield;

FIGURE 6 is an enlarged top view of an assembly which serves to operatively connect the wiper arm and wiper blade together, including a shroud or cover for the assembly;

FIGURE 7 is a longitudinal sectional view of a portion of the wiper arm and the assembly, including portions of the wiper blade;

FIGURE 8 is a transverse section taken substantially on line 8—8 of FIGURE 7;

FIGURE 9 is a transverse section taken substantially on line 9—9 of FIGURE 6 and illustrates the manner in which the shroud is connected to the assembly; and FIGURE 10 is an enlarged partial view of the assembly and blade exemplifying the fact that the blade will tilt as it is pivoted by the actuating means.

This application is a continuation of my copending application Serial No. 424,647, filed April 21, 1954, and now abandoned.

Referring to the drawings, numeral 1 generally designates a wiper arm operably connected to a blade 2 by a subassembly 3.

The wiper arm includes an inner section 4 for attachment with a drive shaft 5 supported on a mounting 6 and a channel section 7 pivotally connected to the inner section by a cross pivot 8.

The blade preferably includes a resilient wiping element 9, a flexible support 10 for the element and a pressure device comprising a pair of secondary yokes 11 operatively connected to the support, a primary yoke 12 having its ends connected to the secondary yokes, and a connector 13 fixed on the primary yoke and having side walls 14 provided with apertures 15 therein.

The subassembly 3 which operatively connects the arm and blade may be designed and constructed in various ways, but as herein illustrated includes an elongate member 16 which actually constitutes an extension or continuation of the channel arm section to which it is fixedly secured. It is, of course, to be understood that the member 16 may constitute an integral part of the arm. The subassembly also includes an elongate member 17 which is located below and is pivotally connected to member 16 by a rivet 18 or the equivalent. The outer extremity of member 16 is provided with an inturned or offset portion 19 and an inner extremity 20 of a width somewhat greater than the outer extremity. The member 17 is similarly provided with an offset portion 21 and an inner extremity 22. The subassembly is preferably pivotally attached to the connector 13 on the blade by providing the offset portion 21 of member 17 with a pair of projections 23 which fit in the apertures 15 of the walls 14 of the connector. The rivet 18 passes through holes provided therefor in the offset portions of the members. Attention is directed to the fact that the longitudinal axis of the rivet and the underside of the wiper arm form an acute angle.

Any means suitable for the purpose may be employed to effect relative movement between the members 16 and 17, but as herein shown the means for this purpose is preferably accomplished by providing the inner extremity 20 of the member 16 with an opening formed to include a slot 24 extending lengthwise of the arm and a slot 25 constituting a continuation of the slot 24 and disposed at an angle thereto. The inner extremity 22 of the member 17 is similarly provided with an opening formed to include a slot 26 and a slot 27. The slots 24 and 26 register with one another when the members are aligned and the slots 25 and 27 are angularly disposed. The slots complement one another and may be termed cam means or cam slots. An element in the form of a cam follower has a head 28 disposed below the member 17 and shank 29 which extends through the slots for movement therein. The shank is provided with a hole within which one end of a flexible wire 30 is secured. The wire 30 constitutes actuating means and preferably extends rearwardly through the channel arm section for guidance and substantial concealment. The inner end of the wire is pivotally attached to the outer end of a fitting 31 adjustably secured to the drive shaft mounting 6.

The angularity of the slots 25 and 27 is preferably such that the drag of the blade on a windshield glass will cause the cam follower to naturally ride into these slots. It will be noted that the members 16 and 17 are preferably made conical in cross section for nesting purposes as well as promoting relative movement between them.

The assembly generally designated 3 is preferably substantially concealed from view by means of a cover or shroud 32. The shroud more or less conforms to the shape of the assembly and it is preferably secured thereto by inturned fingers as shown in FIGURES 6 and 9. It will be noted that the fore end of the shroud is flared and downturned a sufficient distance to more or less conceal the offset end portions of the members as shown in FIGURE 7.

Attention is directed to the fact that the lower member of the assembly 3 and the connector on the primary yoke of the blade assembly are securely connected together so there is no lost motion therebetween. In other words, a positive acting controlled movement is provided between the member and blade.

More particularly in this regard, the pressure device is preferably integrally connected to the wiper arm so as to constitute an original component thereof. Provision is made whereby the wiper blade unit may be detachably connected with respect to the pressure device so that a new blade may be substituted for a worn out blade. Although the details are not illustrated, the ends of the primary yoke are preferably detachably connected with the intermediate portions of the secondary yokes so as to facilitate assembly and disassembly between the yokes of the pressure device and the blade unit.

In view of the foregoing, it will be manifest that the wire 30 will actuate the cam follower and cause the latter to move in the cam slots and thereby effect relative or pivotal movement between the members. More specifically in this regard, the cam follower causes the lower member 17 and blade attached thereto to pivot with respect to the member 16. When the follower is in the slots 24 and 26, the members are held against pivotal movement; but when the follower moves into the angularly disposed slots 25 and 27, the lower member 17 and blade attached thereto will pivot in unison about the axis of the rivet 18 and the offset portions 19 and 21 of the members will cause the lower member and blade to tilt while the latter are being pivoted, as shown in FIGURES 5 and 10, and thereby maintain the blade substantially erect on the wing portion 33 of a windshield as further illustrated in FIGURE 4.

The path that the wiper blade travels on a windshield of the wrap-around type is clearly illustrated in FIGURE 5 of the drawing. More particularly in this regard, the unshaded area is the path that is wiped by the wiper blade. The arrangement is such that the wiper blade will not pivot during its travel from the full-line parked position to the dotted-line position indicated at 34. While the blade is travelling through this arc on the frontal portion of the windshield, the blade is held against pivotal movement due to the fact that the cam follower is located in the longitudinal slots of the members 16 and 17, but as the blade approaches the bend or curvature of the wing portion of the windshield, the cam follower will move into the angularly disposed slots and cause the blade to pivot during its travel from the dotted-line position 34 to the dotted-line position 35, and during the travel the blade is tilted due to the offset portions of the members. The purpose of the tilting of the blade is to maintain the blade in a substantially erect or perpendicular position with respect to the wing portion of the windshield as clearly illustrated in FIGURE 4 in order that the blade will properly wipe the surface to be cleaned. The assembly 3 also affords a setup whereby the area of the windshield to be cleaned can be regulated or controlled.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. In combination: a windshield wiper arm and a blade, an assembly operatively connecting the arm and blade and comprising a pair of relatively movable members, each of said members being provided with means complementing the other, movable means cooperable with said complementing means for imparting relative movement between the members, and additional means on said members serving to tilt the blade with respect to the arm during relative movement between the members.

2. A windshield wiper arm having a device comprising a first member provided with an offset portion and a slot, a second member provided with an offset portion and a slot, means pivotally connecting the offset portions together with the slots crossing one another, means for attaching the device to a blade, means extending into the slots, and means for actuating the extending means for effecting a pivotal movement between the offset portions of the members and a tilting movement between the slotted portions of the members.

3. A windshield wiper arm having a first member provided with an offset portion and cam means, a second member provided with an offset portion and cam means, means pivotally connecting the offset portions together, means for attaching one of the members to a blade, a cam follower engaging both cam means, and means for actuating the cam follower for effecting a pivotal movement between the offset portions of the members and a tilting movement between the cam portions of the members.

4. A windshield wiper arm having a first member and a second member pivotally connected together, means on the second member affording attachment to a blade, means for effecting pivotal movement between the members, and means on each member for causing at least a portion of one member to tilt with respect to the other member during such pivotal movement.

5. A windshield wiper arm having a first member and a second member pivotally connected together, means on one of the members affording attachment to a blade, means for effecting pivotal movement between the members, and means on each member for causing at least a portion of one member to tilt with respect to the other.

6. In combination: a windshield having a frontal portion and a wing portion, a mounting, a drive shaft supported for oscillation in the mounting, a wiper arm having an inner section secured to the shaft and an outer section pivotally connected to the inner section, a wiper blade, an assembly connecting the outer section and blade and comprising a pair of members, a pivot extending through the members to permit pivotal movement of the blade angularly with respect to the arm, means for preventing such pivotal movement when the arm and blade are directed across the frontal portion of the windshield, means for causing such pivotal movement as the blade moves across the wing portion, and means for tilting the blade relative to the outer section in accordance with the degree of curvature of the wing portion so that the blade will be maintained substantially in an erect conforming position at all times during its travel.

7. In combination: a windshield having a frontal portion and a wing portion, a mounting, a drive shaft supported for oscillation in the mounting, a wiper arm having an inner section secured to the shaft and an outer section pivotally connected to the inner section, an assembly secured to the outer arm section and pivotally supporting a blade, said assembly including a member secured to the outer section, a second member pivotally connected to the first member, means on said members, means cooperable with the means on the members for controlling the pivotal movement of the blade with respect to the arm, the arrangement being such that when the wiper arm and blade are directed across the frontal portion of the windshield the said means will prevent pivotal movement of the blade and when the wiper arm and blade approaches or reaches the wing portion of the windshield the said means will function to pivot the blade angularly with respect to the arm as it moves across the wing portion.

8. A windshield wiper arm having a stationary member provided with an offset portion and cam means, a movable member provided with an offset portion and cam means, pivot means connecting the offset portions along an axis intersecting the longitudinal axis of the wiper arm at an acute included angle, means for attaching said movable member to a blade, a cam follower engaging both cam means, and means coacting with the cam follower for pivoting the movable member relative to the stationary member for tilting the blade about the longitudinal axis of the arm.

9. A windshield wiper arm comprising an inner section for attachment with means for actuating the arm and an outer section pivotally connected to the inner section, means for urging the outer section toward a windshield, a member, pivot means pivotally connecting the member to the outer section and means operatively connected to the member for supporting a wiper blade, means operatively associated with the arm for forcibly pivoting the member and means to move the blade relative to the arm, and means disposed adjacent the pivot means for tilting the blade with respect to the arm during such movement.

10. A windshield wiper arm having a fixed member provided with cam means, a blade supporting member having an offset portion pivotally connected to an offset portion of the fixed member and provided with cam means, a cam follower engaging both cam means, and means for actuating the cam follower to cause relative movement between the members.

11. In combination: a windshield wiper arm and a blade, an assembly operatively connecting the arm and blade and comprising a pair of relatively movable members, each of said members being provided with means complementing the other, movable means cooperable with said complementing means, and means for actuating the movable means to impart relative movement between the members for varying the angular relationship between the arm and blade.

12. A windshield wiper arm having a fixed member provided with a cam portion, a member pivotally connected to the fixed member and provided with a cam portion, a cam follower engaging both cam portions, means for actuating the cam follower to cause relative movement between the members, and means on each member constructed and arranged to cause the cam portion of one member to tilt with respect to the cam portion of the other member during such relative movement.

13. In combination: a drive shaft, a wiper arm secured thereto for movement relative to a curved windshield, a wiper blade, means pivotally connecting the arm and blade, and means for forcibly tilting the blade with respect to the arm for maintaining the blade substantially normal to the surface of the windshield to be wiped.

14. A windshield wiper arm adapted to be connected at its inner end to a drive shaft and at its outer end to a wiper blade assembly, and a member movable relative to said wiper arm assisting to forcibly tilt said wiper blade assembly about an axis extending longitudinally in spaced relation to the longitudinal axis of the blade during at least a predetermined portion of the travel of the wiper blade.

15. A windshield wiper arm comprising an outer section having a free extremity, a member and means operatively associated therewith for supporting a blade, a pivot extending through said free extremity and said member for pivotally connecting them together so that the blade may be swung relative to the arm, the free extremity having means disposed adjacent to the pivot for positioning the pivot at an oblique angle relative to the longitudinal axis of the arm, and means operatively associated with the outer section and member being responsive to movement of the arm to cause said member to tilt relative to the arm when swung with respect thereto.

16. A windshield wiper arm having an outer offset end portion, a resiliently flexible blade and a pressure device therefor, a member attached to the pressure device and having an offset portion, means pivotally connecting said offset portions in a manner to locate the axis of the connecting means at an oblique angle with reference to the length of the blade so the latter and pressure device tilt relative to the arm when the member, blade and pressure device as a unit are pivoted about said axis, and means for forcibly effecting pivotal movement between said offset portions.

17. In combination: a windshield wiper arm, an elongate wiper blade, means connecting the arm and blade for relative movement about an axis disposed at an oblique angle to the longitudinal axis of the blade so the latter tilts relative to the arm during such relative movement, and means for forcibly effecting relative movement between the arm and blade.

18. In combination: a windshield wiper arm having an offset portion, an elongate wiper blade assembly, a member connected to the blade assembly and provided with an offset portion, means extending through the offset portions at an oblique angle with reference to the length of the blade assembly, and means forcibly effecting relative pivotal movement between the arm and blade so that the blade assembly may be pivoted and tilted relative to the arm.

19. In combination: a pivot shaft adapted to be mounted adjacent a curved windshield, a wiper arm having an inner section fixed on the shaft and an outer spring-urged section pivotally connected to the inner section, an elongate resiliently flexible wiper blade for wiping the windshield, a pressure device having portions connected to the blade at longitudinally spaced locations, means including a member connecting the pressure device and the outer arm section for relative movement about an axis disposed at an oblique angle with reference to the length of the blade so as to assist in causing the latter to tilt relative to the arm, and means having one end operatively connected to said member and having its other end connected at a location adjacent the pivot shaft for effecting said relative movement between the outer arm section and pressure device.

20. In combination: a pivot shaft adapted to be mounted adjacent a curved windshield, a spring-urged wiper arm having an inner end fixed on the shaft and an outer end, an elongate resilient flexible wiper blade, a member attached to the blade, means disposed at an oblique angle to the length of the blade connecting the member to the outer end of the arm to provide for relative pivotal movement between the arm and blade, and elongate means having one end operatively connected to the outer end of the arm and to the member and having its other end connected at a location adjacent the pivot shaft whereby oscillation of the wiper arm causes the blade to pivot and tilt relative to the arm.

21. An oscillatable windshield wiper arm comprising an outer section having a free extremity, a member and means operatively associated therewith for supporting a blade, a pivot extending through said free extremity and said member for pivotally connecting them together so that the blade may be swung relative to the arm, means disposed adjacent the pivot for positioning the pivot at an oblique angle relative to the longitudinal axis of the arm, said member being provided with means adapted for connection with means for imparting pivotal movement to said member relative to said outer arm section when the windshield wiper arm is oscillated.

References Cited in the file of this patent

UNITED STATES PATENTS

| | | |
|---|---|---|
| 2,079,399 | Drew et al. | May 4, 1937 |
| 2,356,424 | Paton | Aug. 22, 1944 |
| 2,412,319 | Carey | Dec. 10, 1946 |
| 2,533,963 | Sacchini | Dec. 12, 1950 |
| 2,641,007 | Krohm | June 9, 1953 |
| 2,648,351 | Curtis et al. | Aug. 11, 1953 |
| 2,691,186 | Oishei et al. | Oct. 12, 1954 |

FOREIGN PATENTS

| | | |
|---|---|---|
| 1,047,648 | France | July 22, 1953 |